(12) United States Patent
Bremer et al.

(10) Patent No.: US 12,426,588 B2
(45) Date of Patent: Sep. 30, 2025

(54) PRESSURE-BASED FLOW METER FOR A SPRAY NOZZLE

(71) Applicant: Intelligent Agricultural Solutions LLC, Fargo, ND (US)

(72) Inventors: Marshall T. Bremer, Fargo, ND (US); Daniel R. Wood, Jr., Fargo, ND (US)

(73) Assignee: Precision Planting LLC, Tremont, IL (US)

( * ) Notice: Subject to any disclaimer, the term of this patent is extended or adjusted under 35 U.S.C. 154(b) by 846 days.

(21) Appl. No.: 17/618,194

(22) PCT Filed: Jun. 19, 2020

(86) PCT No.: PCT/US2020/038700
§ 371 (c)(1),
(2) Date: Dec. 10, 2021

(87) PCT Pub. No.: WO2020/257628
PCT Pub. Date: Dec. 24, 2020

(65) Prior Publication Data
US 2022/0272959 A1 Sep. 1, 2022

Related U.S. Application Data (60) Provisional application No. 62/864,042, filed on Jun. 20, 2019.

(51) Int. Cl.
| | | |
|---|---|---|
| A01M 7/00 | (2006.01) |
| A01C 23/00 | (2006.01) |
| A01C 23/04 | (2006.01) |
| B05B 1/20 | (2006.01) |
| B05B 12/00 | (2018.01) |
| B05B 12/08 | (2006.01) |

(52) U.S. Cl.
CPC ......... *A01M 7/0089* (2013.01); *A01C 23/007* (2013.01); *A01C 23/047* (2013.01);
(Continued)

(58) Field of Classification Search
CPC ... A01M 7/0089; A01M 7/005; A01C 23/007; A01C 23/047; B05B 1/20; B05B 12/008; B05B 12/085
(Continued)

(56) References Cited

U.S. PATENT DOCUMENTS

| | | |
|---|---|---|
| 4,709,857 A | 12/1987 | Wilger |
| 5,326,036 A | 7/1994 | Wilger |

(Continued)

FOREIGN PATENT DOCUMENTS

EP 3162448 A1 5/2017

OTHER PUBLICATIONS

International Preliminary Report on Patentability for PCT Application No. PCT/US2020/038700, Dated Dec. 30, 2021, pp. 8.

(Continued)

*Primary Examiner* — Christopher S Kim (57) ABSTRACT

A spray nozzle for an agricultural sprayer includes a first actively controlled valve configured to control flow through the spray nozzle. A first pressure sensor is disposed upstream of the valve and a second pressure sensor is disposed downstream of the valve. The position of a valve member of the valve can be sensed, and a size of a restrictive orifice defined by the valve can be determined based on the sensed position of the valve member. A controller is configured to determine a flow rate through the valve based on a difference between a first pressure reading from the first pressure sensor and a second pressure reading from the second pressure sensor.

19 Claims, 4 Drawing Sheets

(52) U.S. Cl.
CPC ............... *A01M 7/005* (2013.01); *B05B 1/20* (2013.01); *B05B 12/008* (2013.01); *B05B 12/085* (2013.01)

(58) Field of Classification Search
USPC .................. 239/74, 159, 164, 443, 444, 578
See application file for complete search history.

(56) References Cited

U.S. PATENT DOCUMENTS

| | | | |
|---|---|---|---|
| 5,967,066 | A | 10/1999 | Giles et al. |
| 6,053,427 | A | 4/2000 | Wilger et al. |
| 6,126,088 | A | 10/2000 | Wilger et al. |
| 10,462,985 | B2 | 11/2019 | Wilger |
| 2012/0228395 | A1 | 9/2012 | Needham et al. |
| 2014/0263709 | A1 | 9/2014 | Kocer et al. |
| 2015/0115058 | A1 | 4/2015 | Wilger |
| 2015/0351375 | A1 | 12/2015 | Ni |
| 2017/0036228 | A1 | 2/2017 | Thurow et al. |
| 2019/0029170 | A1 | 1/2019 | Wilger |
| 2019/0166775 | A1 | 6/2019 | Wilger |
| 2019/0339103 | A1 | 11/2019 | Wilger et al. |

OTHER PUBLICATIONS

International Search Report and Written Opinion for PCT Application PCT/US2020/038700, Dated Sep. 11, 2020, pp. 12.
Wilger, "Wilger Electronic Flow Monitoring System," pp. 4.

PRESSURE-BASED FLOW METER FOR A SPRAY NOZZLE

CROSS-REFERENCE TO RELATED APPLICATION(S)

This application claims the benefit of U.S. Provisional Application No. 62/864,042, filed Jun. 20, 2019 and entitled "PRESSURE-BASED FLOW METER FOR A SPRAY NOZZLE," the disclosure of which is hereby incorporated by reference in its entirety.

BACKGROUND

This disclosure relates generally to sprayers. More particularly, this disclosure relates to parameter sensing for spray nozzles.

Sprayers, such as agricultural sprayers, apply material to a surface, such as a field, by emitting sprays of fluid. Some sprayers, such as agricultural sprayers, emit the fluid in the form of multiple individual sprays of fluid. Nozzles generate the individual sprays and can be spaced along the width of a supply line, such as a boom in agricultural spraying examples. The material can be applied to the surface according to pre-determined spray distributions. For example, in agricultural sprayers the material can be sprayed in the field according to a prescription map, which is a map that specifies application rates throughout the field. The application rates can vary depending on the field conditions.

In some cases, the nozzles and/or groups of nozzles can be individually controlled such that application rates can vary across the width of the supply line. The quality of the spray is based on the pressure and flow rate of the fluid at the nozzle orifice. As such, the pressure and flow rate of the fluid are controlled to ensure a consistent spray.

Flow rate can be calculated based on a pressure difference across an orifice, typically an orifice plate inserted in the flow path. One issue with a flow meter based on pressure drop is that there is a limit to the range of flows to which the sensor is effective or desirable. At high flows, the pressure drop becomes too large from a practical perspective because it would require more expensive components in whatever system it is employed to handle the higher pressures. Additionally, the orifice would wear faster. At low flows the pressure drop becomes harder to measure accurately, again requiring more expensive components. Thus, there is a limited range of practical usability.

SUMMARY

According to one aspect of the disclosure, a sprayer includes a plurality of nozzles disposed along a boom extending from the agricultural sprayer and a controller. A first nozzle of the plurality of nozzles includes a nozzle body having a flowpath extending from a liquid inlet to a spray orifice; a first valve mounted to the nozzle body, the first valve including a first valve member operably connected to a first actuator, the first actuator configured to drive the first valve member relative to a first valve seat to alter a size of a restrictive orifice defined between the first valve member and the first valve seat; a first pressure sensor configured to sense a first liquid pressure in a portion of the flowpath disposed upstream of the first valve; and a second pressure sensor configured to sense a second liquid pressure in a portion of the flowpath disposed downstream of the first valve. The controller is communicatively coupled to the first nozzle and is configured to compare the first liquid pressure received from the first pressure sensor to the second liquid pressure received from the second pressure sensor; determine a pressure drop across the restrictive orifice based on the comparison of the first liquid pressure and the second liquid pressure and on the size of the restrictive orifice; and determine a flow rate through the flowpath based on the pressure drop and the size of the restrictive orifice.

According to another aspect of the present disclosure, a nozzle for a spraying implement includes a nozzle body having a flowpath extending from a liquid inlet to a spray orifice; a first valve mounted to the nozzle body, the first valve including a first valve member operably connected to a first actuator, the first actuator configured to drive the first valve member relative to a first valve seat to alter a size of a restrictive orifice defined between the first valve member and the first valve seat; a first pressure sensor configured to sense a first liquid pressure in a portion of the flowpath disposed upstream of the first valve; and a second pressure sensor configured to sense a second liquid pressure in a portion of the flowpath disposed downstream of the first valve.

According to yet another aspect of the present disclosure, a method includes flowing a liquid to a nozzle; actuating a first valve of the nozzle to an open state, thereby opening a restrictive orifice through the flowpath within the nozzle; determining, by a first pressure sensor, a first liquid pressure upstream of the restrictive orifice; determining, by a second pressure sensor, a second liquid pressure in a portion of the flowpath downstream of the restrictive orifice; and determining a flow rate through the nozzle based on a difference between the first liquid pressure and the second liquid pressure and on a size of the restrictive orifice.

DETAILED DESCRIPTION

Figure 1:
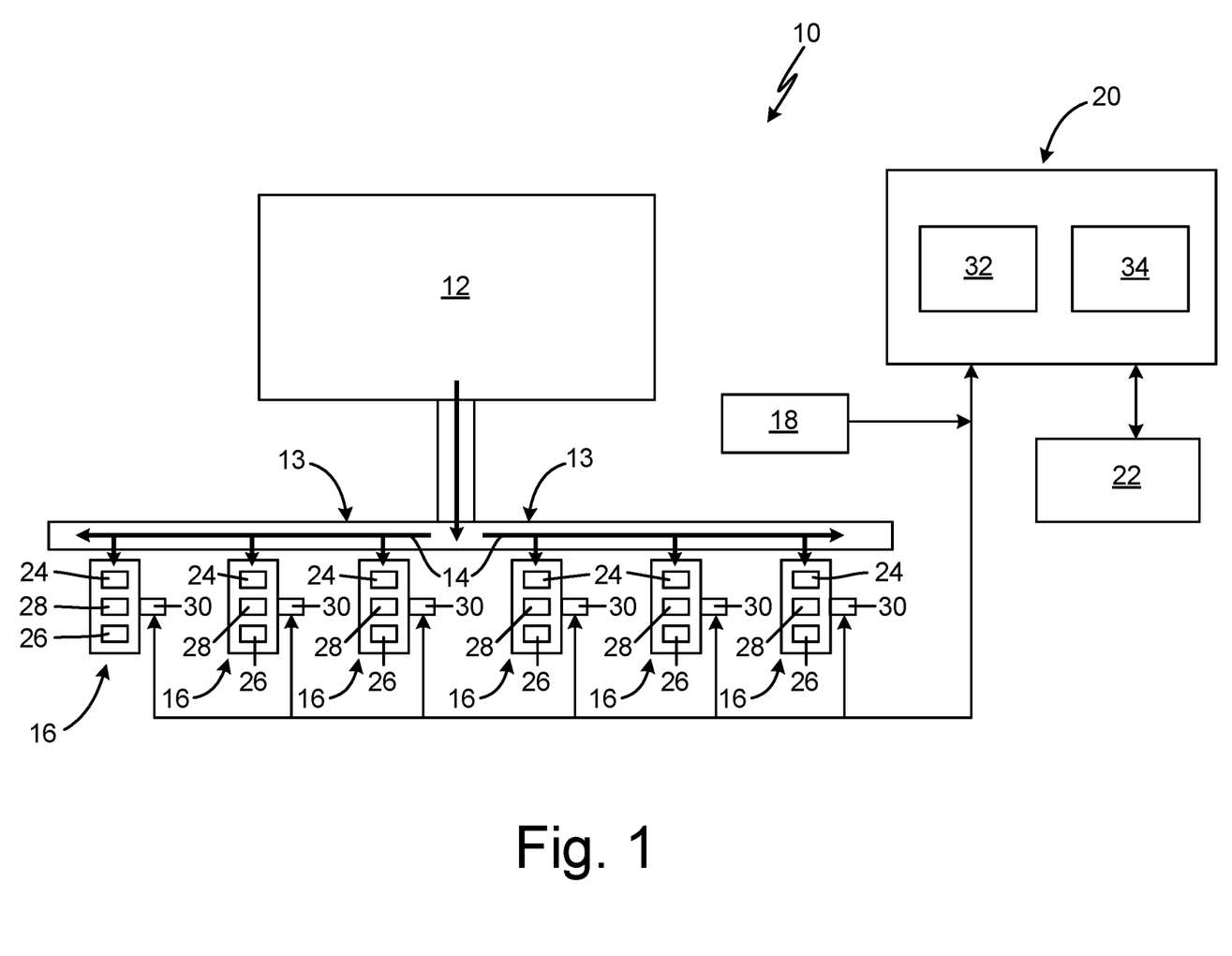
FIG. 1 is a schematic block diagram of a spray system.

FIG. 1 is a schematic block diagram of spray system 10. Spray system 10 includes supply tank 12, booms 13, distribution lines 14, nozzles 16, system sensors 18, control module 20, and user interface 22. Each nozzle 16 includes valve sensor(s) 24, liquid sensor(s) 26, valve(s) 28, and nozzle controller 30. Control module 20 includes control circuitry 32 and memory 34.

Spray system 10 is configured to apply liquid sprays onto a target surface via nozzles 16. For example, spray system 10 can be configured as part of an agricultural spraying system configured to apply liquid sprays to fields. Spray system 10 can be configured to apply herbicides, pesticides, fungicides, and liquid fertilizers, among other options. In some examples, spray system 10 can be integrated into a self-propelled agricultural sprayer. In other examples, spray system 10 can be attached to and towed by another agricultural implement. While spray system 10 is described as implemented in an agricultural sprayer, it is understood that spray system 10 can be operated according to the techniques described herein in multiple environments and across a variety of applications. System sensors 18 are configured to generate data regarding spray system 10 during operation. For example, system sensors 18 can be configured to generate any one or more of geo-positioning data, ground speed data, and wheel deflection data, among other types of data.

Spray system 10 can be integrated into a vehicle that is configured to traverse a surface that the spray is applied to. Supply tank 12 is mounted to the vehicle and stores a supply of liquid for spraying. Supply tank 12 can be mounted to a frame and/or supported by any desired surface of the vehicle. For example, supply tank 12 can be mounted to the frame of an agricultural spraying implement and/or supported by the bed of a truck or other vehicle. Supply tank 12 is configured to provide the liquid to distribution lines 14. Spray system 10 can include a motive device of any desired configuration for driving the liquid through distribution lines 14. For example, supply tank 12 can be pressurized and/or a pump can be disposed to pump the liquid from supply tank 12 through distribution lines 14 to nozzles 16.

Distribution lines 14 are fluidly connected to supply tank 12 to receive liquid from supply tank 12. Distribution lines 14 can be of any configuration suitable for conveying the liquid from supply tank 12 to nozzles 16. Distribution lines 14 can be tubular supply manifolds that project from an agricultural spraying implement. Distribution lines 14 are supported by booms 13 that project laterally from the implement relative to a direction of travel of the implement. The booms 13 can be employed as a single structure or multiple structures supported by the implement. For example, the boom 13 can have two structural sections extending laterally from opposite sides of the vehicle. In some examples, multiple nozzles 16 can be connected to a common distribution line 14 such that the distribution line 14 feeds each of the multiple nozzles 16. In other examples, distribution lines 14 can include multiple individual flow tubes extending to nozzles 16. In one example, spray system 10 can include the same number of flow tubes as nozzles 16. Nozzles 16 are configured to eject the spray portion of the liquid as a liquid spray.

Nozzles 16 are mounted on distribution lines 14 to receive the liquid from distribution lines 14 and to expel the liquid as a spray. Nozzles 16 generate liquid sprays for application on the target surface, such as application in a field. Control module 20 can be configured to provide individual commands to each nozzle 16. For example, control module 20 can generate individual spray commands for each nozzle 16 and communicate each individual spray command to the nozzle controller 30 of each nozzle 16 to thereby control the spray parameters of the liquid spray emitted by each nozzle 16. In one example, the spray commands cause each nozzle 16 to emit a liquid spray having a specified droplet size at a specified application rate.

Each of valve sensor 24 and liquid sensor 26 are configured to generate spray data regarding nozzle 16. Valve sensor 24 is configured to generated valve position information and liquid sensor 26 is configured to generate liquid pressure information. The valve position information includes information related to the positioning of components of valve 28. The positioning of the components of valve 28 relates to the size of the restrictive orifice through valve 28. For example, valve 28 can be actuated by a stepper motor and the valve position information can be a step count. In other examples, valve sensor 24 can be a transducer configured to sense displacement of the valve member of valve 28. For example, valve sensor 24 can be a linear transducer, among other options. The valve position information can provide the size of an orifice through the valve 28.

The liquid pressure information includes information relating to the liquid pressure at different locations in the flowpath through nozzle 16. Liquid sensor 26 can thus include one or more pressure sensors configured to sense the liquid pressure within nozzle 16. In some examples, nozzle 16 can include multiple liquid sensors 26 of different types. Liquid sensors 26 can be disposed on the upstream side of valve 28, the downstream side of valve 28, and/or on both the upstream and downstream sides of valve 28.

Valve 28 is disposed in nozzle 16. Valve 28 is an actively controlled valve that can be positioned in a variety of open positions during operation. Changing the position of the valve member of valve 28 changes the size of the restrictive orifice defined by valve 28, and thus changes the flowpath through valve 28. Each of the different open positions corresponds to a different flow path size through nozzle 16. The positioning of valve 28 controls the liquid flow rate and liquid pressure of the liquid flow downstream of valve 28. In some examples, valve 28 is configured to control the dimensions of a flowpath through the body of nozzle 16. In other examples, valve 28 is configured to control the configuration of the orifice through which the liquid is ejected as a spray. Valve 28 can be actuated to any desired position to generate the liquid spray having the desired flow rate and droplet size. In one example, a first valve 28 controls the dimensions of a flowpath through the body of nozzle 16 and a second valve 28 controls the dimensions of a spray orifice of nozzle 16. In examples where nozzle 16 includes multiple valves 26, it is understood that the valves 26 can all be of the same configuration or can be of differing configurations. In examples where nozzle 16 includes multiple valves 26, each valve 28 can be individually controlled independent of any other valve 28.

Each nozzle 16 includes a nozzle controller 30 that is integrated into the nozzle 16. Nozzle controller 30 is configured to actuate valves 26 in response to spray commands from control module 20 and based on the state of spray system 10. Nozzle controller 30 is configured to cause valve 28 to actuate to a position configured to generate a spray having the desired application rate and droplet size. In some examples, nozzle controller 30 can determine the relative ground speed of nozzle 16 based on the location of nozzle 16 on distribution line 14 and on the ground speed of spray system 10. For example, system sensors 18 can include ground speed sensors, such as speed sensors incorporating geo-positioning receivers. In one example, the ground speed sensors can be disposed at opposite ends of distribution lines 14. Nozzle controller 30 can determine the relative speed of its nozzle 16 based on the location of its nozzle 16 along distribution line 14 and the ground speed each end of distribution line 14. It is understood, however, that system sensors 18 can include any type of sensor suitable for generating the ground speed data. Nozzle controller 30 can be configured to determine the relative ground speed of nozzle 16 according to any suitable technique. Nozzle controller 30 can be of any type suitable for controlling actuation of valve 28 based on commands from control module 20 and/or on spray data from valve sensor 24 and liquid sensor 26. Nozzle controller 30 can include control circuitry and memory. For example, nozzle controller 30 can include a microprocessor, a controller, a digital signal processor (DSP), an application specific integrated circuit (ASIC), a field-programmable gate array (FPGA), or other equivalent discrete or integrated logic circuitry.

Control module 20 is configured to generate and provide spray commands to nozzles 16 to cause nozzles 16 to emit liquid sprays according to a desired application rate and droplet size. In some examples, control module 20 generates individual spray commands and provides an individual spray command to each nozzle 16. In some examples, control module 20 provides individual spray commands to groups of nozzles 16. The application rate is a product of both the flow rate of the liquid in nozzle 16 and the speed of nozzle 16 relative to the surface being sprayed (i.e., the relative ground speed of nozzle 16). For example, the spray command can instruct nozzle 16 to emit a liquid spray having a first application rate and a first droplet size. The spray command can be based on any desired input parameter. For example, a prescription map for a field can be stored in memory 34 of control module 20, and control module 20 can generate the spray commands based on the prescription map. Control module 20 can be configured to generate the spray commands based on geo-positioning data. For example, system sensors 18 can include a geo-positioning receiver communicatively linked to control module 20. Control module 20 can be configured to generate commands based on based on location data from GPS (Global Positioning System), GNSS (Global Navigation Satellite System), GPS/RTK (GPS/Real Time Kinematic), or equivalent systems.

Control module 20 can be of any suitable configuration for controlling operation of components of spray system 10, gathering data, processing data, etc. For example, control module 20 can generate spray commands, send the spray commands to nozzles 16, and receive data from nozzles 16. As such, control module 20 can be of any type suitable for operating in accordance with the techniques described herein. In some examples, control module 20 can be implemented as a plurality of discrete circuitry subassemblies. In some examples, control module 20 can be integrated with the control system for the agricultural implement. In other examples, control module 20 can be separate from and in communication with the control system of the agricultural implement.

Control circuitry 32 is configured to implement functionality and/or process instructions. Control circuitry 32 can include one or more processors, configured to implement functionality and/or process instructions. For example, control circuitry 32 can be capable of processing instructions stored in memory 34. Examples of control circuitry 32 can include any one or more of a microprocessor, a controller, a digital signal processor (DSP), an application specific integrated circuit (ASIC), a field-programmable gate array (FPGA), or other equivalent discrete or integrated logic circuitry. In some examples, control circuitry 32 can include communications circuitry configured to facilitate wired or wireless communications. For example, the communications circuitry can facilitate radio frequency communications and/or can facilitate communications over a network, such as a local area network, wide area network, and/or the Internet.

Memory 34, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 34 is a temporary memory, meaning that a primary purpose of memory 34 is not long-term storage. Memory 34, in some examples, is described as volatile memory, meaning that memory 34 does not maintain stored contents when power to spray system 10 is turned off. Examples of volatile memories can include random access memories (RAM), dynamic random access memories (DRAM), static random access memories (SRAM), and other forms of volatile memories. In some examples, memory 34 is used to store program instructions for execution by control circuitry 32. Memory 34, in one example, is used by software or applications running on control circuitry 32 to temporarily store information during program execution.

Memory 34, in some examples, also includes one or more computer-readable storage media. Memory 34 can be configured to store larger amounts of information than volatile memory. Memory 34 can further be configured for long-term storage of information. In some examples, memory 34 includes non-volatile storage elements. For example, spray system 10 can include non-volatile storage elements such as flash memories or forms of electrically programmable memories (EPROM) or electrically erasable and programmable (EEPROM) memories. In some examples, memory 34 can be external and can be received in a memory card slot of spray system 10. For example, memory 34 can be an external hard drive, flash drive, memory card, secure digital (SD) card, micro SD card, or other such device.

User interface 22 can be any graphical and/or mechanical interface that enables user interaction with control module 20. For example, user interface 22 can implement a graphical user interface displayed at a display device of user interface 22 for presenting information to and/or receiving input from a user. User interface 22 can include graphical navigation and control elements, such as graphical buttons or other graphical control elements presented at the display device. User interface 22, in some examples, includes physical navigation and control elements, such as physically-actuated buttons or other physical navigation and control elements. In general, user interface 22 can include any input and/or output devices and control elements that can enable user interaction with control module 20. In some examples, user interface 22 can be integrated into a cab of an agricultural spraying implement.

The quality of the spray fan generated by each nozzle 16 is dependent on the flow rate and liquid pressure at the spray outlet of each nozzle 16. During operation, the position of valve 28 is altered to thereby adjust the size of a restrictive orifice within the flowpath through nozzle 16. As such, valve 28 provides a variable orifice within each nozzle 16. Valve sensor 24 senses the position of valve 28 and provides valve position information to one or both of nozzle controller 30 and/or control module 20. The size of the restrictive orifice can be determined based on the valve position information. Varying the size of the restrictive orifice through valve 28 alters both the pressure drop across valve 28 and the flow rate through valve 28.

Liquid sensor 26 is configured to sense the liquid pressure within nozzle 16. Liquid sensor 26 provides the liquid pressure information to nozzle controller 30 and/or control module 20. In one example, nozzle 16 includes a first liquid sensor 26 disposed upstream of valve 28 and a second liquid sensor 26 disposed downstream of valve 28. The first liquid sensor 26 can provide first pressure information and the second liquid sensor 26 can provide second pressure information. Comparing the first pressure information and the second pressure information provides a pressure drop across valve 28.

In some examples, a boom pressure sensor can provide the liquid pressure in distribution line 14 while a liquid sensor 26 disposed downstream of valve 28 provides the liquid pressure downstream of valve 28. The liquid pressure in distribution line 14 can be compared to the downstream liquid pressure sensed by liquid sensor 26 to determine the pressure drop and thus calculate the flow rate.

In other examples, a single liquid sensor 26 can be disposed upstream of a valve 28 controlling the size of the spray outlet. The liquid is ejected to the atmosphere from such a valve. As such, the downstream pressure can be assumed as atmospheric pressure. The liquid sensor 26 provides the liquid pressure upstream of valve 28. As such, the pressure drop across valve 28 is the difference between the upstream liquid pressure sensed by liquid sensor 26 and atmospheric pressure.

Generally, the flow rate is proportional to the square root of the pressure drop multiplied by constants of the fluid and a term that defines the restriction. The flow rate through a fixed orifice, such as in an orifice plate, can be calculated based on Equation 1:

$$q_m = \frac{C_d}{\sqrt{1-\beta^4}} \epsilon \frac{\pi}{4} d^2 \sqrt{2\rho_1 \Delta p} \qquad \text{Equation 1}$$

Where,
  $q_m$=mass flow rate
  $C_d$=coefficient of discharge
  $\beta$=ratio of the orifice diameter to pipe diameter
  $\epsilon$=expansibility factor, typically 1
  d=internal orifice diameter
  $\rho_1$=fluid density
  $\Delta p$=differential pressure measured across the restriction In certain situations, with extreme flows or pressure drops, or with complex orifice geometries, Equation 1 may not accurately model the physics of the fluid flow and an empirical approach can be used to determine the flow given an orifice geometry and measured pressure drop.

Nozzle controller 30 and/or control module 20 can determine the flow rate of the liquid through nozzle 16 based on the liquid pressure information and the valve position information. The position of valve 28 can be changed to alter the flow rate and pressure drop across valve 28. In examples where valve 28 is actuated by a stepper motor, various sizes of the restrictive orifice can be pre-determined based on various step counts and stored in a memory of nozzle controller 30 and/or memory 34 of control module 20. The pre-determined sizes can be recalled from the memory and utilized along with the determined pressure drop to calculate the flow rate through nozzle 16.

During operation, nozzle controller 30 and/or control module 20 control the positioning of valve 28 to control the spray fan generated by nozzle 16. As discussed above, the quality of the spray fan is dependent both on pressure and flow rate through nozzle 16. Nozzle controller 30 and/or control module 20 receive liquid pressure information from liquid sensors 26 and can calculate flow rate based on a sensed pressure drop across valve 28. As such, liquid sensor 26 provide both liquid pressure information and flow rate information.

Typically, a fixed restrictive orifice is utilized to calculate flow based on pressure differential. However, problems arise with fixed restrictive orifices in spray nozzles. At high flows, the pressure drop becomes too large from a practical perspective because it would require more expensive components in whatever system it is employed to handle the higher pressures. Additionally, the orifice would wear faster. At low flows the pressure drop becomes harder to measure accurately (again requiring more expensive components). Thus, there is a limited range of practical usability.

The size of the variable restriction of valve 28 can be changed to produce a pressure drop that is small, but not too small to measure accurately. During operation of nozzle 16, the flow rate and the pressure drop are both varied to produce a spray fan having desired qualities. Each nozzle 16 includes a variable orifice and liquid sensors 26. The flow rate within each nozzle 16 can be determined based on the size of the orifice through valve 28 and on the pressure drop across valve 28. The size of the variable restriction of valve 28 can be changed to produce a pressure drop that is sufficiently small to be economically measured, while still being large enough to measure accurately. Flow rate can thereby be determined based on pressure measurements from liquid sensors 26. As such, nozzle 16 does not require a separate flow rate sensor. Nozzle 16 is thereby more robust and easier to assemble. In addition, nozzle 16 can be more compact and include more rigid mounting, providing increased user confidence and eliminating a potential failure point. Moreover, eliminating a flow sensor eliminates moving components from each nozzle 16, making each nozzle simpler. Pressure sensing also provides quick feedback that allows for more precise control of spraying from each nozzle 16.

Figure 2:
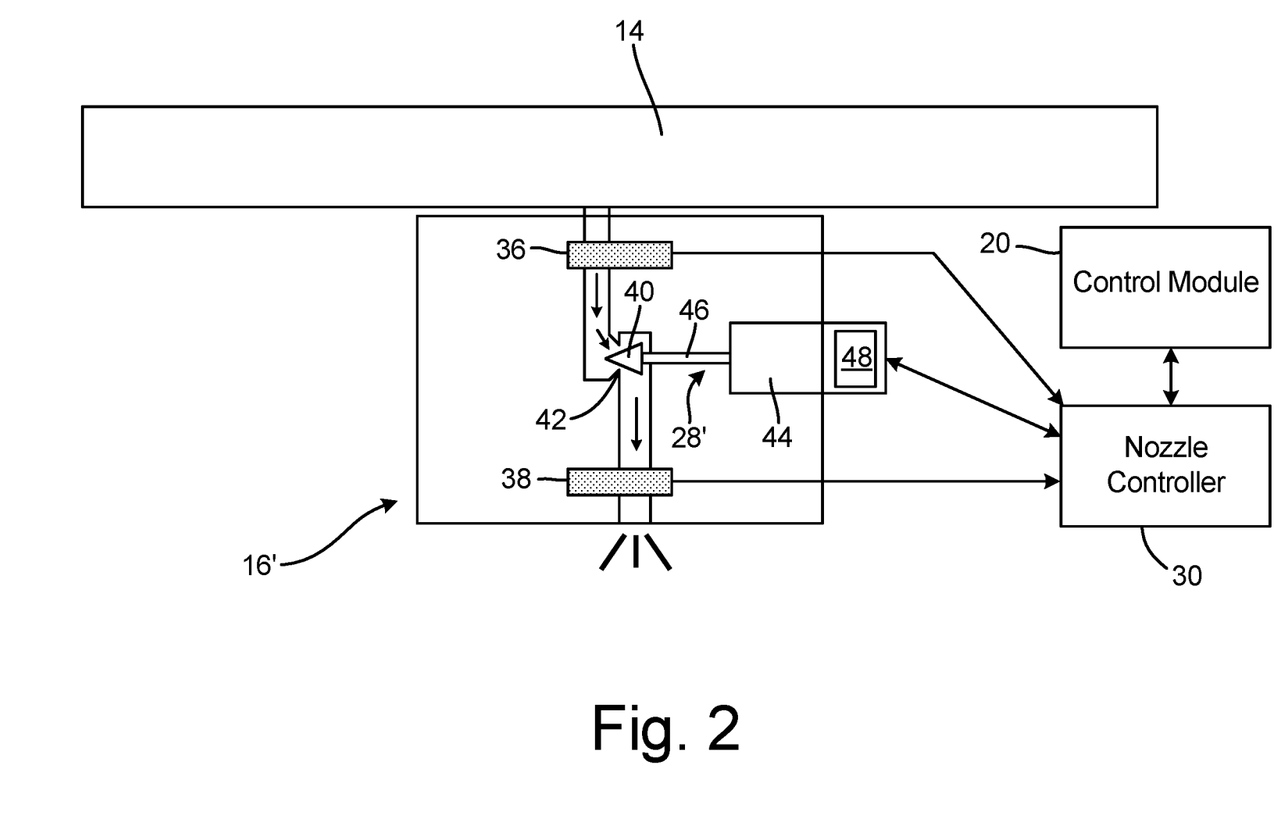
FIG. 2 is a schematic block diagram of a nozzle.

FIG. 2 is a block schematic diagram of nozzle 16'. Distribution line 14 and control module 20 of spray system 10 (FIG. 1) are shown. Nozzle 16' includes valve 28', nozzle controller 30, first pressure sensor 36, and second pressure sensor 38. Valve 28' includes valve member 40, valve seat 42, actuator 44, arm 46, and position sensor 48.

Nozzle 16' is substantially similar to nozzle 16' (FIG. 1) and can be operated according to the techniques described herein. Nozzle 16' is mounted to distribution line 14 to receive liquid from distribution line 14. Nozzle 16' is configured to eject a liquid spray at a particular application rate and droplet size.

The liquid enters nozzle 16' from distribution line 14 and flows past first pressure sensor 36. First pressure sensor 36 is a pressure sensor configured to generate liquid pressure information regarding the liquid flowing through nozzle 16'. First pressure sensor 36 is substantially similar to liquid sensor 26 (FIG. 1). First pressure sensor 36 is disposed upstream of valve 28' such that first pressure sensor 36 senses the liquid pressure upstream of valve 28'. As such, first pressure sensor 36 can generate upstream pressure data. First pressure sensor 36 can be of any type suitable for sensing the pressure of the liquid flowing through nozzle 16'.

The liquid flows downstream from first pressure sensor 36 and through valve 28'. Valve 28' is an actively controlled valve configured to create a variable restrictive orifice in the flowpath extending through nozzle 16'. Valve 38 thereby controls a flow rate of the liquid through nozzle 16'. Valve member 40 is disposed in the flowpath through nozzle 16'. Valve member 40 is configured to engage valve seat 42 when valve 28' is in a closed state. The position of valve member 40 can be actively controlled throughout operation to control the size of the orifice through valve 38. The gap formed between valve member 40 and valve seat 42 when valve 28' is in an open state defines the restrictive orifice through nozzle 16'. Valve member 40 can be of any type suitable for controlling flow through nozzle 16'. For example, valve member 40 can be a needle, among other options.

Actuator 44 is connected to valve member 40 and is configured to actuate valve member 40 between various positions. Actuator 44 can be of any type suitable for actuating flow control valve between a closed state and one or more open positions. For example, actuator 44 can be an electric motor, a pneumatic motor, or a hydraulic motor, among other options. In some examples, actuator 44 is a stepper motor. In one example, actuator 44 is an electric stepper motor.

Arm 46 extends from actuator 44 to valve member 40. Arm 46 is driven by actuator 44 and drives movement of valve member 40 to alter the size of the orifice defined between valve member 40 and valve seat 42. Arm 46 can be of any suitable configuration for driving valve member 40. In one example, arm 46 is configured to be linearly driven by actuator 44. For example, arm 46 can be a piston or a shaft, among other options. In another example, arm 46 is configured to be rotatably driven by actuator 44. For example, arm 46 can be a screw, among other options.

Position sensor 48 is configured to generate valve position information regarding the position of valve member 40. In some examples, position sensor 48 is configured to sense displacement of arm 46, which correlates to movement of valve member 40 and thus to the position of valve member 40. In examples where arm 46 is linearly driven, position sensor 48 can be a linear transducer configured to sense displacement of piston. In examples where arm 46 is rotatably driven, position sensor 48 can be configured to sense rotation of arm 46. For example, position sensor 48 can be a Hall-effect sensor or an encoder. In examples where actuator 44 is a stepper motor, position sensor 48 can be configured to provide a step count. It is understood, however, that position sensor 48 can be of any type suitable for generating valve position information. Position sensor 48 provides the valve position information to one or both of nozzle controller 28 and control module 20. The size of the restrictive orifice between valve member 40 and valve seat 42 can be determined based on the valve position information from position sensor 48.

The liquid flows downstream through the restrictive orifice of valve 28' and past second pressure sensor 38. Second pressure sensor 38 is configured to generate liquid pressure information regarding the liquid flowing through nozzle 16'. Second pressure sensor 38 is disposed downstream of valve 28' such that second pressure sensor 38 senses the liquid pressure downstream of valve 28'. As such, second pressure sensor 38 can generate downstream pressure data. Second pressure sensor 38 can be of any type suitable for sensing the pressure of the liquid flowing through nozzle 16'.

During operation, pressurized liquid flows through distribution line 14. The liquid enters nozzle 16' from distribution line 14 and flows through nozzle 16'. A control signal is provided to actuator 44 by a controller, such as by nozzle controller 30 and/or control module 20, and actuator 44 drives valve member 40 from a closed state to an open position. Opening valve member 40 opens a fluid path through valve 28' and the fluid begins to flow from distribution line 14, through nozzle 16', and out through a spray outlet of nozzle 16'.

As valve 28' is actuated open, position sensor 48 senses the degree to which valve 28' is open, such as by sensing movement of arm 46 or counting steps in examples where actuator 44 is a stepper motor. Position sensor 48 provides the valve position information to the controller. The controller can determine the size of the restrictive orifice formed between valve member 40 and valve seat 42 based on the position of valve position information.

First pressure sensor 36 senses the liquid pressure upstream of valve 28'. Second pressure sensor 38 senses the liquid pressure downstream of valve 28'. Each of first pressure sensor 36 and second pressure sensor 38 generate liquid pressure information and provide that liquid pressure information to the controller. The controller can determine a pressure differential between the upstream liquid pressure and the downstream liquid pressure based on the liquid pressure information from first pressure sensor 36 and second pressure sensor 38. The controller is configured to determine the flow rate through nozzle 16' based on the size of the orifice of valve 28', as determined from the valve position information received from position sensor 48, and based on the pressure differential across valve 28', as determined from the liquid pressure information from first pressure sensor 36 and second pressure sensor 38. The position of valve member 40 can be adjusted throughout operation to control the pressure drop across valve 28' and the flow rate through valve 28'.

Nozzle 16' provides significant advantages. Valve 28' creates a variable orifice within nozzle 16'. The pressure drop across the variable orifice can be measured, and the flow rate through nozzle 16' can be determined based on the pressure drop and the size of the orifice. Because the size of the orifice is adjustable, the pressure drop is also adjustable. As such, the magnitude of the pressure drop can be actively controlled by controlling the positioning of valve 28'. The size of the orifice can be controlled to ensure that the pressure drop is neither too large nor too small to provide an accurate measurement. Controlling the magnitude of the pressure drop ensures the accuracy of the flow rate derived from the pressure differential. Measuring flow rate based on pressure differential can provide a redundancy to a flow meter, which can indicate when the flow meter is malfunctioning. Alternatively, the flow meter can be eliminated from the nozzle 16', thereby providing a simpler, more compact arrangement Eliminating the flow meter also removes moving parts associated with the flow meter.

Figure 3:
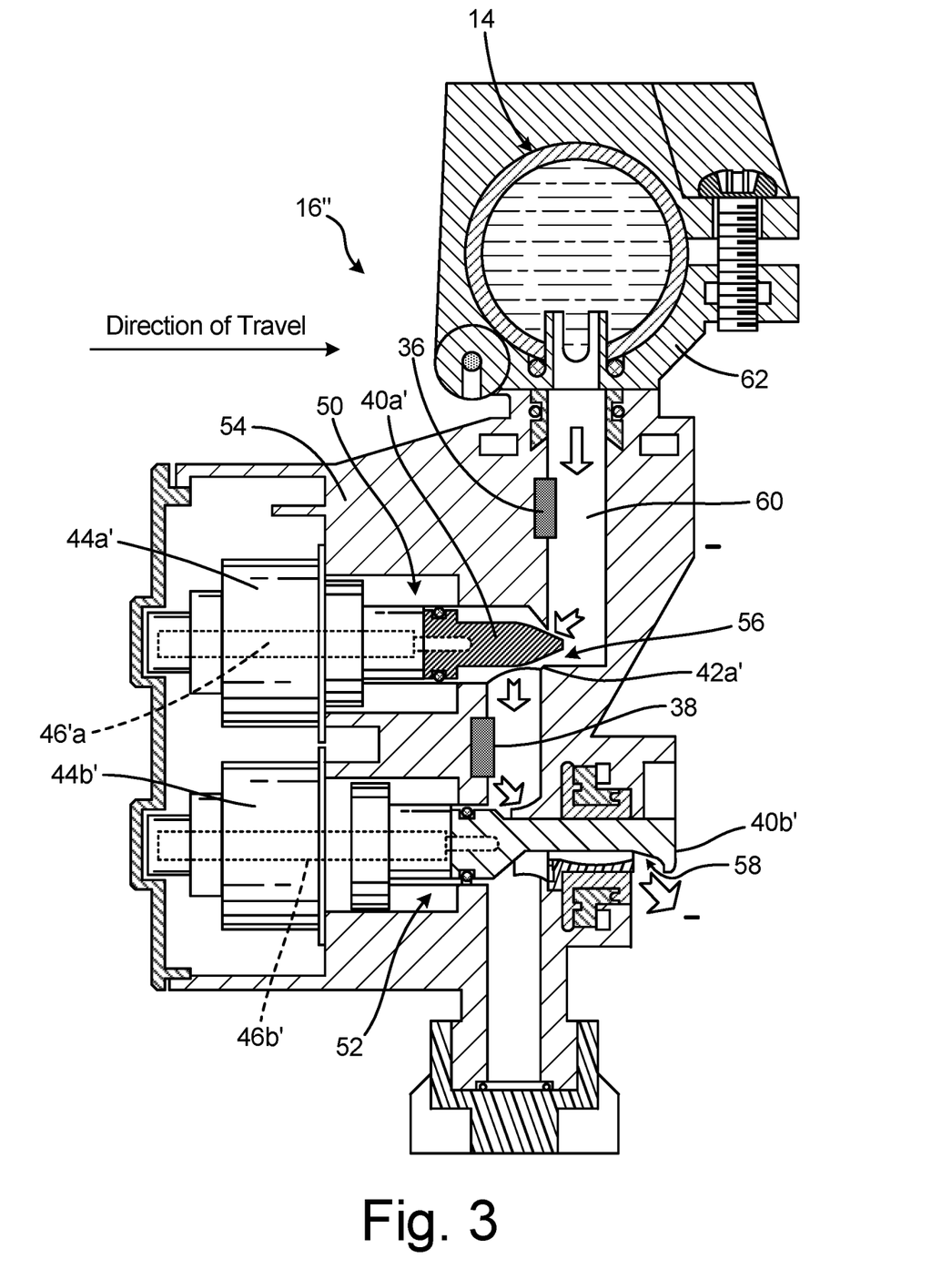
FIG. 3 is a cross-sectional view of a nozzle.

FIG. 3 is a cross-sectional view of nozzle 16". Distribution line 14 of spray system 10 (FIG. 1) is shown. Nozzle 16" includes first pressure sensor 36, second pressure sensor 38, flow control valve 50, orifice valve 52, nozzle body 54, restrictive orifice 56, spray orifice 58, flowpath 60, and mount 62. Flow control valve 50 includes valve member 40$a'$, valve seat 42$a'$, actuator 44$a'$, and arm 46$a'$. Orifice valve 52 includes valve member 40$b'$, actuator 44$b'$, and arm 46$b'$.

Nozzle 16" is substantially similar to nozzle 16 (FIG. 1) and nozzle 16' (FIG. 2). It is understood that nozzle 16" can be operated in accordance with the techniques described herein. Nozzle 16" is mounted to distribution line 14. Mount 62 is attached to nozzle body 54 and is configured to clamp onto distribution line 14. Flowpath 60 extends through nozzle body 54 to spray orifice 58. Spray orifice 58 generates the liquid spray as the liquid exits flowpath 60.

First pressure sensor 36 is disposed in nozzle body 54 on an upstream side of flow control valve 50. First pressure sensor 36 is configured to generate liquid pressure information regarding the liquid flowing into nozzle 16". First pressure sensor 36 can be of any type suitable for sensing the liquid pressure in the portion of flowpath 60 upstream of flow control valve 50 and for generating data regarding the sensed liquid pressure. For example, first pressure sensor 36' can be diaphragm mounted on a printed circuit board disposed in nozzle body 54. The diaphragm can be exposed to the flowpath 60 and the liquid pressure in flowpath 60 can cause the diaphragm to flex. The diaphragm flex is sensed by the printed circuit board, which is configured to convert the magnitude of the flex into liquid pressure data.

Flowpath 60 extends through nozzle body 54 from first pressure sensor 36 to spray orifice 58. Flow control valve 50 is mounted to nozzle body 54. Actuator 44$a'$ is mounted to nozzle body 54. In the example shown, actuator 44$a'$ is an electric stepper motor. The number of steps are counted by a position sensor, such as sensor 24 (FIG. 1) or position sensor 48 (FIG. 2), and can be communicated to one of nozzle controller 28 (FIG. 1) and/or control module 20 (FIG. 1). Valve position information for flow control valve 50 can be generated based on the step count from actuator 44*a*'. While actuator 44*a*' is described as an electric stepper motor, it is understood that actuator 44*a*' can be of any type suitable for discretely altering the position of valve member 40*a*'.

Valve member 40*a*' is disposed in flowpath 60. In the example shown, valve member 40*a*' is a needle configured to engage valve seat 42*a*'. It is understood, however, that valve member 40*a*' can be of any configuration suitable for controlling flow through flowpath 60. Valve seat 42*a*' is formed by nozzle body 54. It is understood, however, that valve seat 42*a*' can be formed separately from nozzle body 54 and mounted to or otherwise disposed within nozzle body 54. Restrictive orifice 56 is formed between valve member 40*a*' and valve seat 42*a*'. The size of restrictive orifice 56 changes as valve member 40*a*' is repositioned relative to valve seat 42*a*'.

Arm 46*a*' extends from actuator 44*a*' to valve member 40*a*'. In the example shown, arm 46*a*' is a shaft driven by actuator 44*a*' to adjust the position of valve member 40*a*'. It is understood, however, that arm 46*a*' can be of any type suitable for actuating valve member 40*a*'. Actuator 44*a*' can be configured to drive arm 46*a*' either linearly or rotatably.

The portion of flowpath 60 between flow control valve 50 and orifice valve 52 forms a pressure chamber immediately upstream of orifice valve 52. Second pressure sensor 38 is associated with that portion of the flowpath 60 downstream of flow control valve 50 and upstream of orifice valve 52. Second pressure sensor 38 is configured to generate pressure data regarding the liquid pressure in that portion of the flowpath 60. Second pressure sensor 38 can be of any configuration suitable for sensing the liquid pressure in flowpath 60 and for generating pressure data regarding that liquid pressure. For example, second pressure sensor 38 can include a diaphragm mounted on a printed circuit board disposed in nozzle body 54. The diaphragm can be exposed to the flowpath 60 and the liquid pressure in flowpath 60 can cause the diaphragm to flex. The diaphragm flex is sensed by the printed circuit board, which is configured to convert the magnitude of the flex into liquid pressure data.

The liquid is ejected as a spray through spray orifice 58. Orifice valve 52 is configured to control the size of spray orifice 58 during spraying. As such, spray orifice 58 is a variable orifice. Orifice valve 52 is mounted to nozzle body 54. Actuator 44*b*' is mounted to nozzle body 54. In the example shown, actuator 44*b*' is an electric stepper motor. The number of steps are counted by a position sensor, such as sensor 24 or position sensor 48, and can be communicated to one of nozzle controller 28 and/or control module 20. Valve position information for orifice valve 52 can be generated based on the step count. While actuator 44*b*' is described as an electric stepper motor, it is understood that actuator 44*b*' can be of any type suitable for discretely altering the position of valve member 40*b*'.

Valve member 40*b*' defines spray orifice 58. In the example shown, valve member 40*b*' is an impingement member configured to turn the liquid and generate the liquid spray. The liquid pressure upstream of valve member 40*b*', the flow rate through orifice valve 52, and the size of spray orifice 58 control the droplet size of the liquid spray. While valve member 40*b*' is described as an impingement member, it is understood that valve member 40*b*' can be of any configuration suitable for generating the spray. Arm 46*b*' extends from actuator 44*b*' to valve member 40*b*'. In the example shown, arm 46*b*' is a shaft driven by actuator 44*b*' to adjust the position of valve member 40*b*'. It is understood, however, that arm 46*b*' can be of any type suitable for actuating valve member 40*b*'. Actuator 44*b*' can be configured to drive arm 46*b*' either linearly or rotatably.

The flow rate through flow control valve 50 and the pressure drop across flow control valve 50 are controlled by the positioning of valve member 40*a*' relative to valve seat 42*a*'. Adjusting the position of valve member 40*a*' to reduce the size of restrictive orifice 56 decreases the flow rate and increases the pressure drop. Increasing the size of restrictive orifice 56 increases the flow rate and decreases the pressure drop. The flow rate is proportional to the square root of the pressure drop. The flow rate through nozzle 16" can thus be determined based on the pressure drop caused by restrictive orifice 56. The difference in the pressures sensed by first pressure sensor 36 and second pressure sensor 38 provides the pressure drop across restrictive orifice 56. The size of restrictive orifice 56 can be altered to control the magnitude of the pressure drop across flow control valve 50. As such, the flow rate through nozzle 16" can thereby be determined and controlled without requiring a flow meter.

Figure 4:
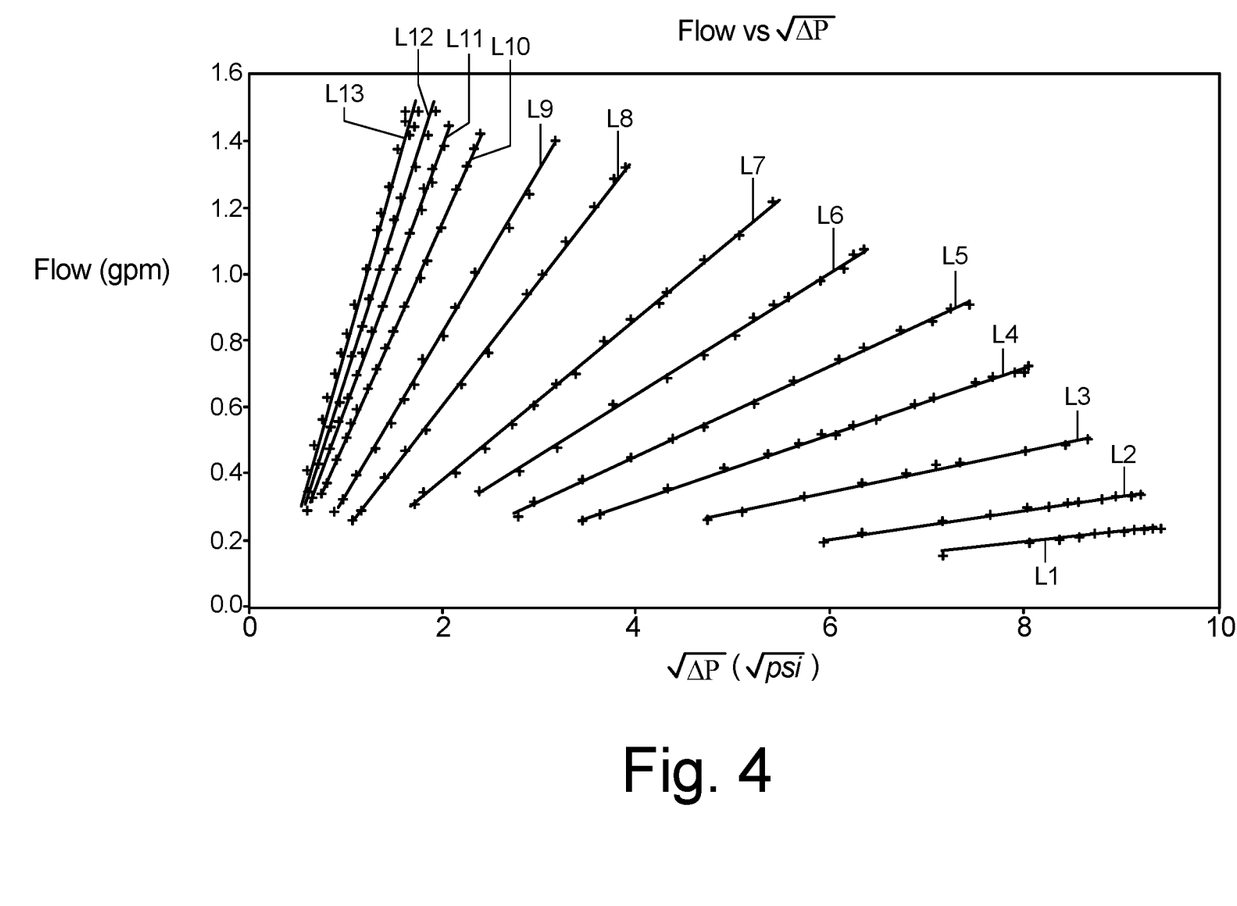
FIG. 4 is a graph of flow rate versus the square root of pressure drop for various orifice opening sizes.

FIG. 4 is a graph illustrating flow rate versus the square root of pressure drop. The vertical axis is flow rate and the horizontal axis is the square root of pressure drop across a variable restrictive orifice, such as restrictive orifice 56 (FIG. 3). The flow rate and pressure drop were measured with the restrictive orifice open to different degrees. Linear fit lines L1-L13 are shown for each degree of opening of the variable orifice.

Each of lines L1-L13 show the linear fit of flow versus the square root of pressure drop at different open states of the restrictive orifice. As discussed above, the restrictive orifice is a variable orifice that can be controlled by a stepper motor. Each one of the linear fit lines L1-L13 corresponds to a certain number of steps of the electric stepper motor controlling the size of the restrictive orifice. L1 shows the linear fit line for measurements taken with the restrictive orifice at its smallest opening, corresponding to 25 steps, or about 5% open. L13 shows the linear fit line for measurements taken with the restrictive orifice at its largest opening, corresponding to 500 steps, or about 100% open. L2 corresponds to 30 steps, or about 6% open. L3 corresponds to 40 steps, or about 8% open. L4 corresponds to 50 steps, or about 10% open. L5 corresponds to 60 steps, or about 12% open. L6 corresponds to 80 steps, or about 16% open. L7 corresponds to 100 steps, or about 20% open. L8 corresponds to 140 steps, or about 28% open. L9 corresponds to 180 steps, or about 36% open. L10 corresponds to 230 steps, or about 46% open. L11 corresponds to 300 steps, or about 60% open. L12 corresponds to 400 steps, or about 80% open. As shown, flow rate is linear with the square root of pressure for each open state of the restrictive orifice.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sprayer comprising:
a plurality of nozzles disposed along a boom extending from the sprayer, wherein a first one of the plurality of nozzles comprises:
   a nozzle body having a flowpath extending from a liquid inlet to a spray orifice;
   a first valve mounted to the nozzle body, the first valve including a first valve member operably connected to a first actuator, the first actuator configured to drive the first valve member relative to a first valve seat to alter a size of a restrictive orifice defined between the first valve member and the first valve seat;
   a position sensor operatively coupled to the first valve, the position sensor configured to generate position information regarding the first valve member;
   a first pressure sensor configured to sense a first liquid pressure in a portion of the flowpath disposed upstream of the first valve; and
   a second pressure sensor configured to sense a second liquid pressure in a portion of the flowpath disposed downstream of the first valve;
a controller communicatively coupled to the first nozzle, wherein the controller is configured to:
   determine the size of the restrictive orifice based on the position information;
   compare the first liquid pressure received from the first pressure sensor to the second liquid pressure received from the second pressure sensor;
   determine a pressure drop across the restrictive orifice based on the comparison of the first liquid pressure and the second liquid pressure and on the size of the restrictive orifice; and
   determine a flow rate through the flowpath based on the pressure drop and on the size of the restrictive orifice.

2. The sprayer of claim 1, wherein the controller is a nozzle controller integrated into the first nozzle.

3. The sprayer of claim 1, wherein:
the controller is a control module communicatively connected to each nozzle of the plurality of nozzles; and
the control module includes:
   a control circuitry; and
   a memory encoded with instructions that, when executed by the control circuitry, cause the control circuitry to determine the flow rate.

4. The sprayer of claim 1, wherein the actuator is an electric motor.

5. The sprayer of claim 4, wherein the actuator is a stepper motor, and wherein the size of the restrictive orifice is determined based on a step count.

6. The sprayer of claim 1, further comprising:
an agricultural spraying implement configured to traverse a field and apply a liquid to the field;
wherein the boom extends from the agricultural sprayer.

7. A sprayer comprising:
a plurality of nozzles disposed along a boom extending from the sprayer, wherein a first one of the plurality of nozzles comprises:
   a nozzle body having a flowpath extending from a liquid inlet to a spray orifice;
   a first valve mounted to the nozzle body, the first valve including a first valve member operably connected to a first actuator, the first actuator configured to drive the first valve member relative to a first valve seat to alter a size of a restrictive orifice defined between the first valve member and the first valve seat;
   a first pressure sensor configured to sense a first liquid pressure in a portion of the flowpath disposed upstream of the first valve; and
   a second pressure sensor configured to sense a second liquid pressure in a portion of the flowpath disposed downstream of the first valve;
   a second valve mounted to the nozzle body at a location downstream of the first valve, the second valve including a second valve member operably connected to a second actuator, the second actuator configured to drive the second valve member to alter a size of the spray orifice; and
a controller communicatively coupled to the first nozzle, wherein the controller is configured to:
   compare the first liquid pressure received from the first pressure sensor to the second liquid pressure received from the second pressure sensor;
   determine a pressure drop across the restrictive orifice based on the comparison of the first liquid pressure and the second liquid pressure and on the size of the restrictive orifice; and
   determine a flow rate through the flowpath based on the pressure drop and on the size of the restrictive orifice.

8. A nozzle for an agricultural spraying implement, the nozzle comprising:
a first nozzle body having a first flowpath extending from a first liquid inlet to a first spray orifice;
a first valve mounted to the first nozzle body, the first valve including a first valve member operably connected to a first actuator, the first actuator configured to drive the first valve member relative to a first valve seat to alter a size of a first restrictive orifice defined between the first valve member and the first valve seat;
a first pressure sensor configured to sense a first liquid pressure in a portion of the first flowpath disposed upstream of the first valve; a second pressure sensor configured to sense a second liquid pressure in a portion of the first flowpath disposed downstream of the first valve; and
a second valve mounted to the nozzle body at a location downstream of the first valve, the second valve including a second valve member operably connected to a second actuator, the second actuator configured to drive the second valve member to alter a size of the spray orifice; and
a controller configured to control actuation of at least one of the first valve member and the second valve member based on a measured pressure differential between the first liquid pressure and the second liquid pressure.

9. The nozzle of claim 8, wherein the controller is communicatively coupled to the first valve, the first pressure sensor, and the second pressure sensor, and wherein the controller is configured to:
   compare the first liquid pressure received from the first pressure sensor to the second liquid pressure received from the second pressure sensor;
   determine a pressure drop across the restrictive orifice based on the comparison of the first liquid pressure and the second liquid pressure; and
   determine a flow rate through the flowpath based on the pressure drop.

10. The nozzle of claim 9, wherein the controller is configured to control a position of the first valve member and the second valve member based on the determined flow rate.

11. The nozzle of claim 8, wherein the actuator is an electric stepper motor, and wherein the size of the restrictive orifice is determined based on a step count.

12. The nozzle of claim 8, further comprising:
a position sensor operatively coupled to the first valve, the first position sensor configured to generate position information regarding the first valve member.

13. A nozzle assembly for an agricultural spraying implement, the nozzle assembly comprising:
a plurality of spray nozzles configured to mount to a boom of an agricultural spraying implement, wherein a first spray nozzle of the plurality of spray nozzles is the nozzle of claim 8; and
wherein a second spray nozzle of the plurality of nozzles comprises:
a second nozzle body having a second flowpath extending from a second liquid inlet to a second spray orifice;
a third valve mounted to the second nozzle body, the third valve including a third valve member operably connected to a third actuator, the third actuator configured to drive the third valve member relative to a third valve seat to alter a size of a third restrictive orifice defined between the third valve member and the third valve seat;
a third pressure sensor configured to sense a third liquid pressure in a portion of the second flowpath disposed upstream of the second valve; and
a fourth pressure sensor configured to sense a fourth liquid pressure in a portion of the second flowpath disposed downstream of the second valve.

14. A method of applying liquid sprays to a ground surface, the method comprising:
flowing a liquid through a boom of an agricultural spraying implement and to a plurality of spray nozzles disposed along the boom;
controlling a first liquid spray emitted by a first spray nozzle of the plurality of spray nozzles by:
actuating a first valve of the first spray nozzle to an open state, thereby opening a first restrictive orifice through a first flowpath within the first spray nozzle;
determining, by a first pressure sensor, a first liquid pressure upstream of the first restrictive orifice;
determining, by a second pressure sensor, a second liquid pressure in a portion of the flowpath downstream of the first restrictive orifice;
determining the first flow rate through the first spray nozzle based on a difference between the first liquid pressure and the second liquid pressure and on a size of the first restrictive orifice; and
controlling a position of the first valve based on the determined first flow rate.

15. The method of claim 14, wherein the step of determining the first liquid pressure includes at least one of:
measuring the first liquid pressure in a portion of the first flowpath upstream of the first restrictive orifice; and
measuring the first liquid pressure in a portion of the boom of the agricultural spraying implement.

16. The method of claim 14, further comprising:
controlling a second liquid spray emitted by a second spray nozzle of the plurality of spray nozzles by:
actuating a second valve of the second spray nozzle to an open state, thereby opening a second restrictive orifice through a second flowpath within the second spray nozzle;
determining, by a third pressure sensor, a third liquid pressure upstream of the second restrictive orifice;
determining, by a fourth pressure sensor, a fourth liquid pressure in a portion of the second flowpath downstream of the second restrictive orifice; determining the second flow rate through the second spray nozzle based on a difference between the third liquid pressure and the fourth liquid pressure and on a size of the second restrictive orifice; and controlling a position of the second valve based on the determined second flow rate.

17. The method of claim 14, further comprising:
sensing actuation of the first valve; and
determining, based on the sensed actuation of the first valve, the size of the first restrictive orifice.

18. The method of claim 14, further comprising:
actuating a second valve of the first spray nozzle to an open state, thereby opening a spray orifice of the first spray nozzle, wherein the liquid is ejected from the first spray nozzle through the spray orifice.

19. The method of claim 18, further comprising:
adjusting a position of the first valve and a position of the second valve based on the determined first flow rate.

* * * * *